Nov. 26, 1935.        E. K. COLE        2,022,106

TAKE-UP DEVICE

Filed July 27, 1934

Inventor
Elmer K. Cole
by Orwig & Hague Att'ys

Patented Nov. 26, 1935

2,022,106

UNITED STATES PATENT OFFICE 2,022,106

TAKE UP DEVICE

Elmer K. Cole, Centralia, Mo.

Application July 27, 1934, Serial No. 737,289

10 Claims. (Cl. 267—72)

My object is to provide a take up device adapted for use in connection with highway guard cables for the purpose of taking up slack in said cables under various conditions of contraction and expansion of the cables, and to constantly maintain said cables under yielding tension to withstand excessive shocks applied to the cables, such, for instance, as when struck by a motor vehicle, without breaking the cables.

More specifically it is my object to provide a take up device of this character, made of simple and inexpensive parts which may be readily, quickly and easily assembled, and readily and easily adjusted to apply the desired tension to the cables, and in which the maximum strains and stresses to which the assembly is subjected in use will not injuriously affect the resiliency of the spring.

My invention consists in the construction, arrangement and combination of the various parts of the device, whereby the objects contemplated are attained, as hereinafter more fully set forth, pointed out in my claims, and illustrated in the accompanying drawing, in which:

Figure 2:
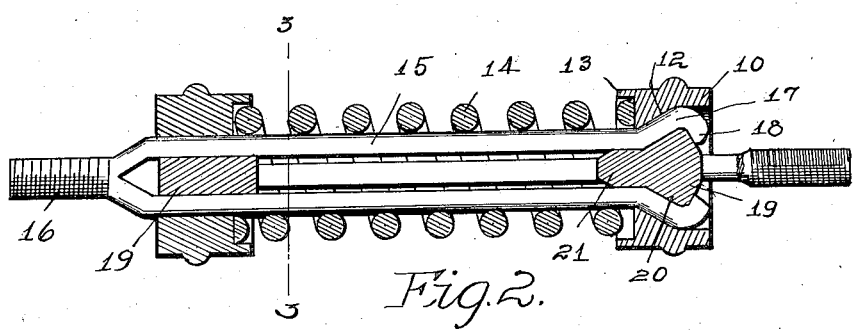
Figure 2 shows a longitudinal sectional view of same.
Figure 1:
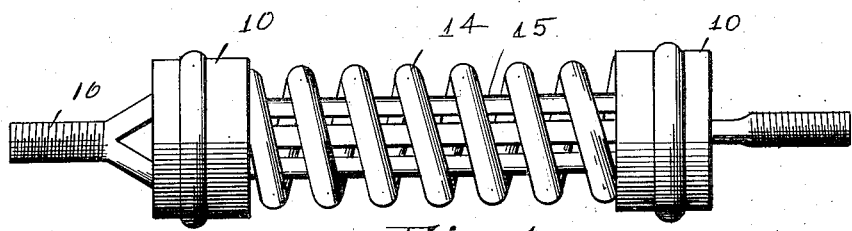
Figure 1 shows a side elevation of my improved take up device.

Referring to the accompanying drawing it will be seen that my improved take up device comprises two head members 10. Each of these head members has an opening through its center, and surrounding this opening in the head are four notches; two of them, indicated by the numeral 11, are tapered inwardly, as shown at 12 in Figure 2, and the other two run straight through the head member. These four notches are substantially equally spaced apart.

On the inner end of the head member 10 is a circular flange 13. A coil spring 14 has its ends engaging the inner ends of the head members 10 and is held in position by the flanges 13.

Extending through the openings in the head members 10 are two rods, each of which is preferably composed of two half round arms 15 which may be welded together at one end and formed into a screw-threaded rod 16. At the opposite ends of said arms there is formed an outwardly inclined member 17, and the ends of the arms are inclined inwardly at 18.

I have also provided a locking block, indicated generally by the numeral 19, for each rod. This locking block is substantially flat on two sides, and is provided on the two opposite sides with outwardly inclined portions, as shown at 20 in Figure 2, with an extension 21 having parallel sides to enter between the parallel portions of the arms 15.

Figure 3:
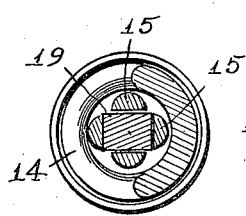
Figure 3 shows a transverse sectional view on the line 3—3 of Figure 2.
Figure 4:
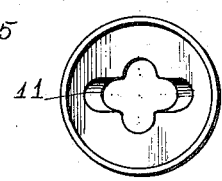
Figure 4 shows an end view of one of the head members.
Figure 5:
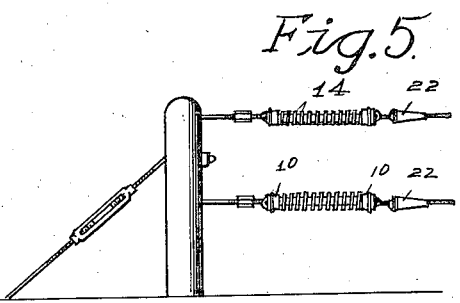
Figure 5 shows the side elevation of a portion of a highway guard rail fence with my improved take up device applied to both cables thereof.

My improved take up device is assembled as follows:

First, the two rods are placed in a position relative to each other as shown in the drawing, that is to say, with the round screw-threaded end of one rod projecting in one direction and the like member of the other rod extending in the other direction, and the arms of both rods are arranged in planes at right angles to each other, as clearly shown in Figure 3. Then, the spring is placed in position surrounding the rods, and then the heads are placed in position by first compressing the arms 17 toward each other to permit the heads to be placed in position with the openings therein surrounding the outwardly projecting portions 17 of the end portions of the rods.

After this has been completed the locking blocks are placed in position as follows:

First, the head member 10 is moved inwardly until the inclined portions 17 of the rods project beyond the head member. Then, the locking block 19 is placed in position with its inclined surfaces 20 engaging the inclined portions 17 of both arms of one of the rods and the flat surfaces of the locking block 19 between the adjacent surfaces of the arms of the other rod, as shown in Figure 3. Then, when the head is again moved outwardly by the spring, the inclined portions 17 of one rod will rest in the inclined notches 11 of one of the heads, and the straight portions of the arms of the other rod will have their flat sides adjacent to the flat sides of the locking block, as shown in Figure 3. The other locking block is placed in position in a similar manner.

Obviously, all of this can be done readily, quickly and easily, and without the use of bolts, rivets, screws or other fastening devices.

When assembled, the full tension of the spring is exerted to move the head members 10 away from each other. Hence, the tension of the spring will hold the inclined portions 17 of the rods firmly in their grooves, and this will hold the locking blocks firmly in their centered positions between the arms of both rods. The locking blocks are held against outward movement by the end portions 18 of the arms engaging the outer ends of the locking blocks.

When assembled in a highway guard rail or the like the screw-threaded rods 16 are inserted in cable end fittings 22 of ordinary construction, having screw-threaded openings to receive the screw-threaded portion 16 of the rod at one or both ends, and, obviously, when these cable end fittings 22 are rotated, the spring 14 is thereby compressed until the desired tension has been applied to the cable.

In the event that, when in use, a severe strain is applied to the cable, the head members 10 will move toward each other and compress the spring 14, but the spring cannot be compressed beyond the point where the coils thereof will engage each other, and, hence, the spring cannot be compressed to a point beyond its ordinary modulus of elasticity. Hence, in use, the spring cannot be injured regardless of the amount of strain applied to the cable.

In practical use it has been found that my improved take up device is of very simple and inexpensive construction, and except for the screw threads at the ends of the rods, needs no machine work or accurate fitting, and is assembled without the use of bolts, rivets, screws or other fastening devices. When once assembled it can be shipped and handled without possibility of the parts becoming detached from each other, and may be readily and quickly installed in a highway guard rail by unskilled workmen.

I claim as my invention:

1. In a take up device, the combination of two head members, a coil spring having its ends in engagement with said head members for forcing them apart, two rods each having two spaced apart arms at one end, each arm being formed with a notch at its inner side, said rods being extended through said head members in opposite directions with the said arms of one rod within one of said heads and the arms of the other rod within the other head, and a locking block between the arms of each rod, said locking block being formed with a lug to enter said notch for holding the locking block against longitudinal movement relative to the arms.

2. In a take up device, the combination of two head members, a coil spring having its ends in engagement with said head members for forcing them apart, two rods each having two spaced apart arms at one end, said rods being extended through said head member with the arms of one rod within one head member and the arms of the other rod within the other head member, a locking block inserted between the arms of each rod, said arms and locking blocks being formed with co-acting lugs and notches to prevent longitudinal movement of the arms relative to the locking block.

3. In a take up device, the combination of two head members, a coil spring having its ends in engagement with said head members for forcing them apart, two rods each having two spaced apart arms at one end, said rods being extended through said head member with the arms of one rod within one head member and the arms of the other rod within the other head member, a locking block inserted between the arms of each rod, said arms and locking blocks being formed with co-acting lugs and notches to prevent longitudinal movement of the arms relative to the locking block, said rods and head members being formed with co-acting members for limiting the movement of the head members away from each other.

4. In a take up device, the combination of two head members, a coil spring having its ends in engagement with said head members for forcing them apart, two rods each having two spaced apart arms at one end, said rods being extended through said head member with the arms of one rod within one head member and the arms of the other rod within the other head member, a locking block inserted between the arms of each rod, said arms and locking blocks being formed with co-acting lugs and notches to prevent longitudinal movement of the arms relative to the locking block, said rods and head members being formed with co-acting members for limiting the movement of the head members away from each other and being shaped to permit the movement of the head members towards each other.

5. In a take up device, the combination of two head members each formed with a central opening and with notches on opposite sides of said opening, the notches being tapered inwardly toward the inner end of the head member, a coil spring engaging the inner ends of both head members, two rods each having two parallel spaced apart arms, the end portions of the arms being inclined outwardly away from each other and then inwardly toward each other, said rods being extended through said head members with the inclined portions of one rod engaging the tapered notches of one head member and the inclined portions of the other rod engaging the tapered notches of the other head member, and being arranged within the head members with the four arms equally spaced apart, and a locking block for each pair of arms having outwardly extended lugs on opposite sides to enter and engage said outwardly and inwardly extended portions of one set of said arms and to enter between and hold spaced apart the other set of arms.

6. In a take up device, the combination of two head members, a coil spring between them tending to hold them separated, two rods extended through the head members, one of said rods having two arms at one end, and a locking block, said arms and locking block being formed with co-acting members shaped to readily permit the insertion of the locking block between the arms when the arms are projected beyond the head member and to prevent longitudinal movement of the locking block relative to the head member.

7. In a take up device, the combination of two head members, a coil spring between them tending to hold them separated, two rods extended through the head members, one of said rods having two arms at one end, and a locking block, said arms and locking block being formed with co-acting members shaped to readily permit the insertion of the locking block between the arms when the arms are projected beyond the head member and to prevent longitudinal movement of the locking block relative to the head member, and said head member and said arms being formed with co-operating members to limit the inward movement and permit the outward movement of the head members relative to the said arms.

8. In a take up device, the combination of a head member formed with an opening and with four notches equally spaced apart on the interior of said opening, two rods having spaced apart arms extended through said opening, one arm in each of said notches, and a locking block between said arms and within said opening, the arms of one rod and said locking block being formed with co-operating members for preventing longitudinal movement of the locking block relative to said arms, and the arms of the other rod being free to move longitudinally relative to the locking block.

9. In a take up device, the combination of a head member formed with an opening and with four notches equally spaced apart on the interior of said opening, two rods having spaced apart arms extended through said opening, with one arm in each of said notches, and a locking block between said arms and within said opening, the arms of one rod and said locking block being formed with co-operating members for preventing longitudinal movement of the locking block relative to said arms, and the arms of the other rod being free to move longitudinally relative to the locking block, the locking block being shaped to limit inward movement of all of said arms.

10. In a take up device, the combination of a head member formed with an opening and with four notches equally spaced apart on the interior of said opening, two rods having spaced apart arms extended through said opening, one arm in each of said notches, and a locking block between said arms and within said opening, the arms of one rod and said locking block being formed with co-operating members for preventing longitudinal movement of the locking block relative to said arms, and the arms of the other rod being free to move longitudinally relative to the locking block, the locking block being shaped to limit inward movement of all of said arms and the opening in said head member being shaped to prevent outward movement of the arms when in position within the head member.

ELMER K. COLE.